United States Patent
Resnick et al.

(10) Patent No.: US 7,081,313 B2
(45) Date of Patent: Jul. 25, 2006

(54) CATHODE-TO-CATHODE FUEL CELL STACKS

(75) Inventors: Gennady Resnick, South Windsor, CT (US); Jung S. Yi, Mansfield Center, CT (US); Tadahiko Taniguchi, Kawasaki (JP); Akira Maekawa, Yokohama (JP)

(73) Assignee: UTC Fuel Cells, LLC, South Windsor, CT (US)

( * ) Notice: Subject to any disclaimer, the term of this patent is extended or adjusted under 35 U.S.C. 154(b) by 18 days.

(21) Appl. No.: 10/950,714

(22) Filed: Sep. 27, 2004

(65) Prior Publication Data

US 2006/0068235 A1    Mar. 30, 2006

(51) Int. Cl.
*H01M 8/04* (2006.01)
(52) U.S. Cl. .......................... 429/26; 429/32
(58) Field of Classification Search ............... 429/26
See application file for complete search history.

(56) References Cited

U.S. PATENT DOCUMENTS

2001/0036568 A1*  11/2001  Farkash et al. ............... 429/26
2005/0170235 A1*   8/2005  Hu et al. ...................... 429/38

* cited by examiner

*Primary Examiner*—Michael Barr
*Assistant Examiner*—Tony Chuo
(74) *Attorney, Agent, or Firm*—M. P. Williams

(57) ABSTRACT

A plurality of fuel cell stacks (8, 8a, 9, 9a) have their cathode ends (11, 12) contiguous with either a common current collector (15a–15d) or respective current collectors (15a, 15b) which may be separated by electrical isolation (27a, 27b). The cathode-to-cathode relationship protects the cathode of each of the stacks from cold ambient environments, thereby permitting improved cold starts and mitigation of performance loss as a result of cold starts as well as freeze/thaw cycles. Heaters (30, 30a–30d) may be provided in current collectors, or in or between electrical isolation. Four stacks may share one current collector, or each may have its own current collector.

1 Claim, 4 Drawing Sheets

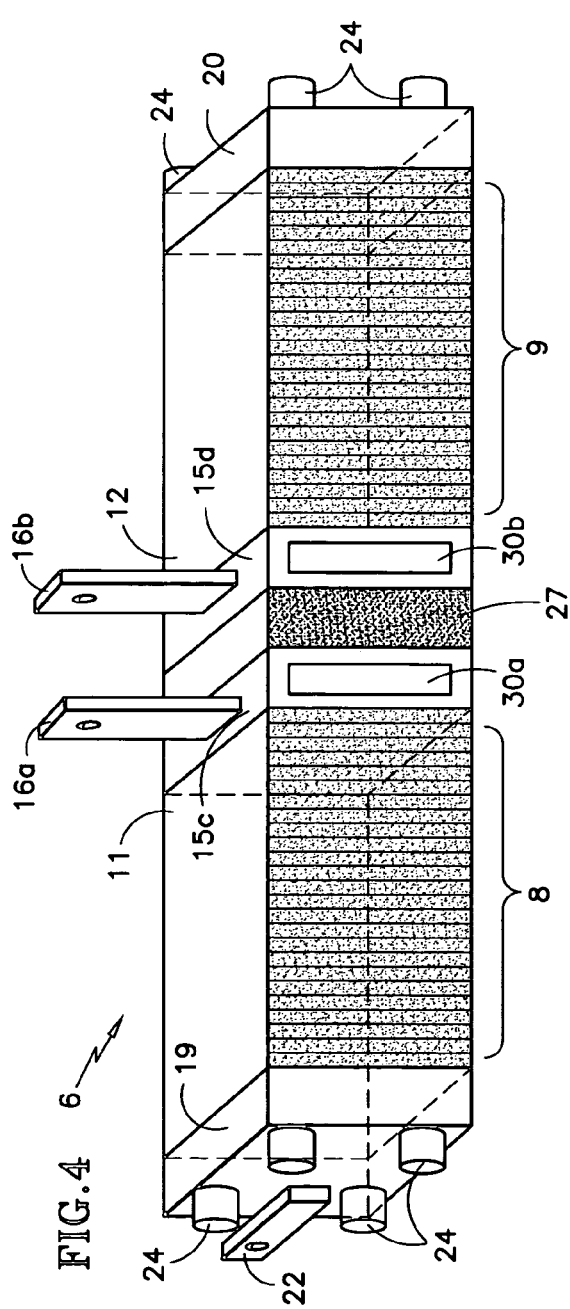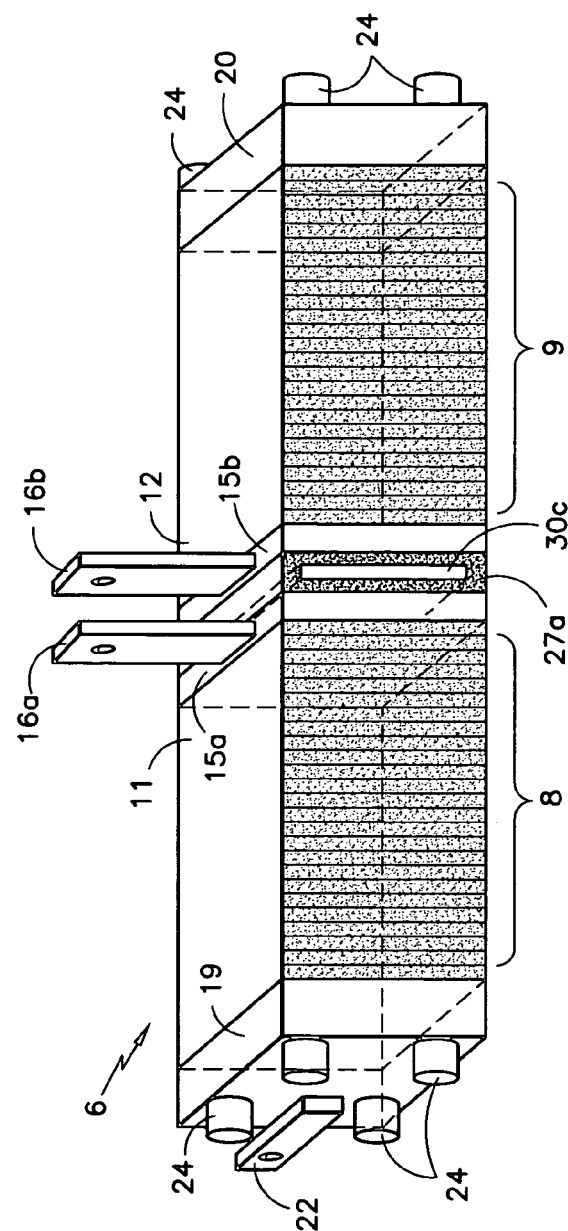

CATHODE-TO-CATHODE FUEL CELL STACKS

TECHNICAL FIELD

This invention relates to a plurality of fuel cell stacks which are contiguous at their cathode ends so as to reduce cathode end exposure to cold temperatures, thereby reducing startup time as well as performance loss resulting from cold cathodes at startup and freeze/thaw cycling; optional heaters may be used.

BACKGROUND ART

It is known that the startup of a polymer electrolyte, proton exchange membrane (PEM) fuel cell at temperatures below the freezing point of water may result in delays in startup as well as loss of performance of the fuel cell (the voltage at any current density). Causes of the performance loss include water frozen on the surface of the membrane electrode assembly and in the gas diffusion layer which impedes access of the reactant gases to the catalytic surface of the membrane electrode assembly. Another cause is freezing of water generated by the electrochemical reaction (product water) at the cathode, restricting or totally blocking the oxidant gas pathways, which significantly slows down the reaction. Ice in the fuel cell interfaces may result in high cell electrical resistance which reduces current flow and power output, slowing the process of warming the fuel cell stack.

All of these performance factors relate to the amount and location of water in the fuel cells. It is known to have shut down procedures which include draining processes to reduce the amount of water in the fuel cells, which however leaves some water within the membrane electrode assembly, as well as in coolant channels (if such are used) within the reactant gas channel plates.

Copending PCT patent application Ser. No. 04/17997, filed Jun. 2, 2004, teaches that a temperature gradient moves water through the fuel cells from one place with a higher temperature to another place with a lower temperature. Successful startup at subfreezing temperatures requires that the amount of water on the cathode side of the fuel cells be reduced to facilitate access of the oxidant, such as air, to the catalytic surface, and to increase pore volume available for newly generated product water.

Similar problems result simply from allowing an inoperative fuel cell to undergo freeze/thaw cycles.

DISCLOSURE OF INVENTION

Objects of the invention include: reducing problems of subfreezing startup fuel cell power plants; mitigating performance loss as a result of starting fuel cell power plants at subfreezing temperatures or freeze/thaw cycling; reducing the effects of cold temperatures on the starting performance of fuel cell power plants; reduced startup time; and improved fuel cell power plant operation.

According to the present invention, a pair of fuel cell stacks are interconnected contiguously at their cathode ends, whereby to reduce the exposure of the cathode ends of the fuel cell stacks to cold temperatures, thereby to mitigate performance loss and reduce startup time.

More than two fuel cell stacks may have their cathode ends disposed in mutual proximity in order to reduce heat loss at the cathode end of each stack.

There may be a heater disposed between the cathode ends of two or more stacks, or the current collectors at the cathode ends may themselves have heaters disposed therein.

The invention may be practiced with the cathode-to-cathode fuel cell stacks sharing a single current collector between the two cathodes, or with each fuel cell stack having its own current collector, the current collectors being electrically isolated. The invention may be practiced with internal reactant gas and coolant manifolds or with external manifolds, or a combination thereof.

BRIEF DESCRIPTION OF THE DRAWINGS

FIG. 4 is a simplified, stylized perspective view of a fuel cell power plant with heaters in each current collector of the respective stacks.

FIG. 5 is a simplified stylized perspective view of a fuel cell power plant having a heater disposed in the electrical isolation between the respective stacks.

MODE(S) FOR CARRYING OUT THE INVENTION

Figure 1:
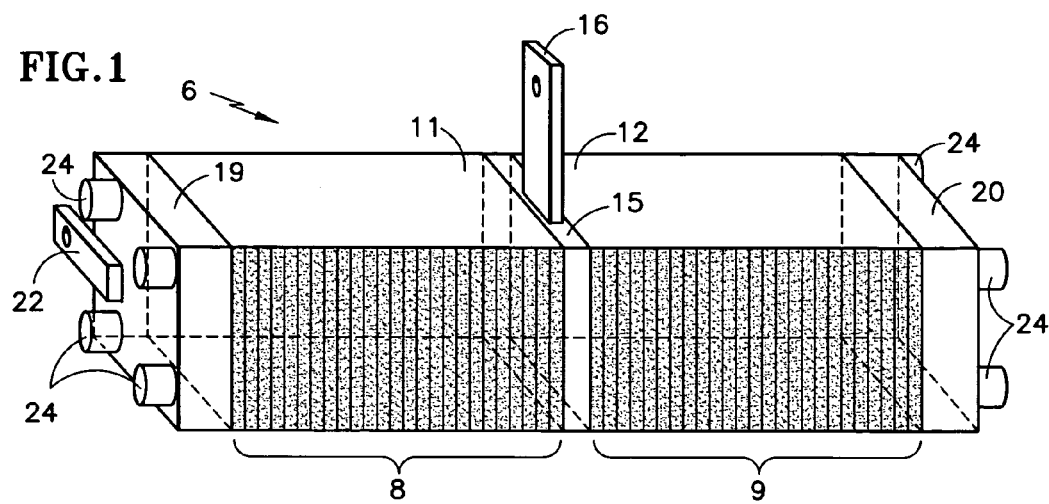
FIG. 1 is a simplified, stylized perspective view of a fuel cell power plant having two cathode-to-cathode fuel cell stacks sharing a common current collector.

Referring to FIG. 1, a fuel cell power plant 6 according to the invention includes a pair of fuel cell stacks 8, 9 having their cathode ends 11, 12 contiguous with a common current collector 15 and a current output bus bar 16. At the end of each stack 8, 9 there is a corresponding pressure plate 19, 20 (sometimes referred to as "end plates"). In the configurations herein, the pressure plates 19, 20 also serve as current collectors, and each has an anode current output bus bar 22. In this configuration, tie rods (not shown for clarity) will draw both of the stack assemblies together by tightening against the pressure plates 19, 20.

In the configurations herein, fittings 24 for internal manifolds are shown. Not shown, for clarity, are external manifolds which may, for instance, either be on the top and bottom of the stack or at the front and back of the stacks or both. Various combinations of internal and external manifolds are consistent with the invention.

Because the two cathode ends 11, 12 of the stacks 8, 9 are contiguous, the cathode ends are not exposed to the ambient environment to the same extent as they would be in fuel cell stacks not connected cathode-to-cathode. A typical twin-stack configuration has two stacks contiguous at reactant gas inlet manifolds (equivalent to the front and/or the back of the fuel cell stacks 8, 9 as shown in FIG. 1. This leaves the cathodes exposed on one end and the anodes exposed on another end, in a configuration illustrated in copending U.S. patent application Ser. No. 10/713,799, filed Nov. 13, 2003.

With less exposure to cold ambient environment, the cathode ends 11, 12 of the stacks 8, 9 are less subject to the aforementioned water migration and cathode freezing and flooding problems.

Figure 2:
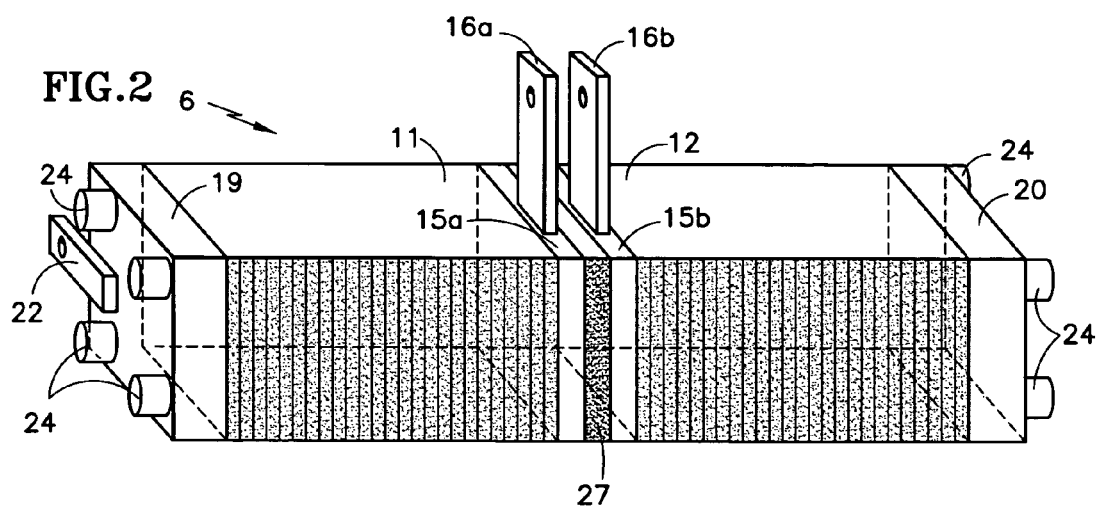
FIG. 2 is a simplified, stylized perspective view of a fuel cell power plant having two cathode-to-cathode fuel cell stacks each having its own current collector.

In FIG. 2, another embodiment of the invention employs a current collector 15a, 15b for each stack 8, 9. Each current collector has a cathode current output bus bar 16a, 16b. In FIG. 2, the two current collectors 15a, 15b are electrically isolated from each other by electrical isolation 27, such as rigid insulation which can withstand the pressure of the tie rods as described hereinbefore.

Figure 3:
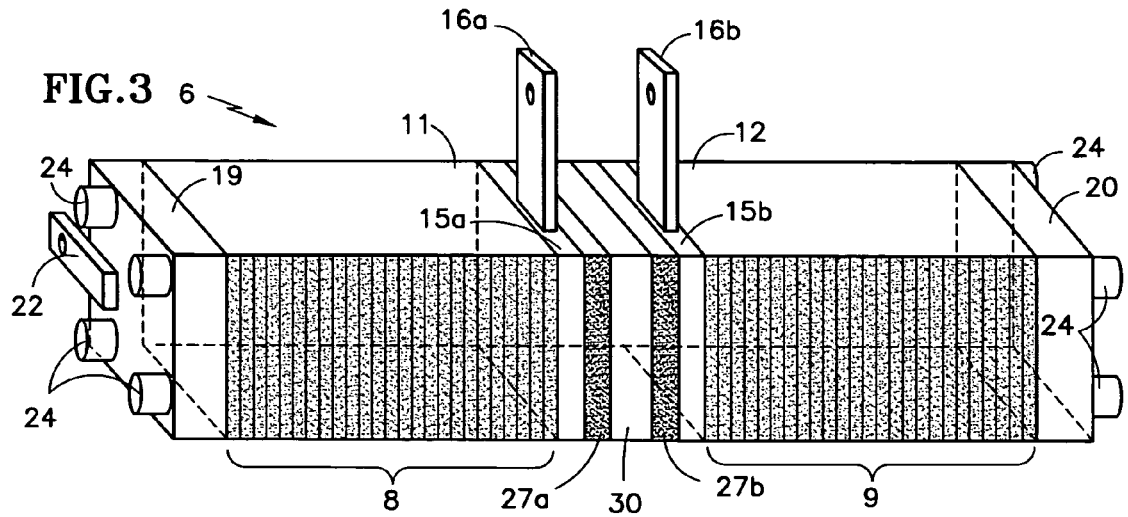
FIG. 3 is a simplified, stylized perspective view of a fuel cell power plant with a heater between end plates of contiguous fuel cell stacks.

In FIG. 3, the electrical isolation is in two parts 27a, 27b and a heater 30 is disposed therebetween. In FIG. 4, each of the end plates 15c, 15d has a respective heater 30a, 30b. In FIG. 5, the electrical isolation 27a has a heater 30c disposed therein.

Figure 6:
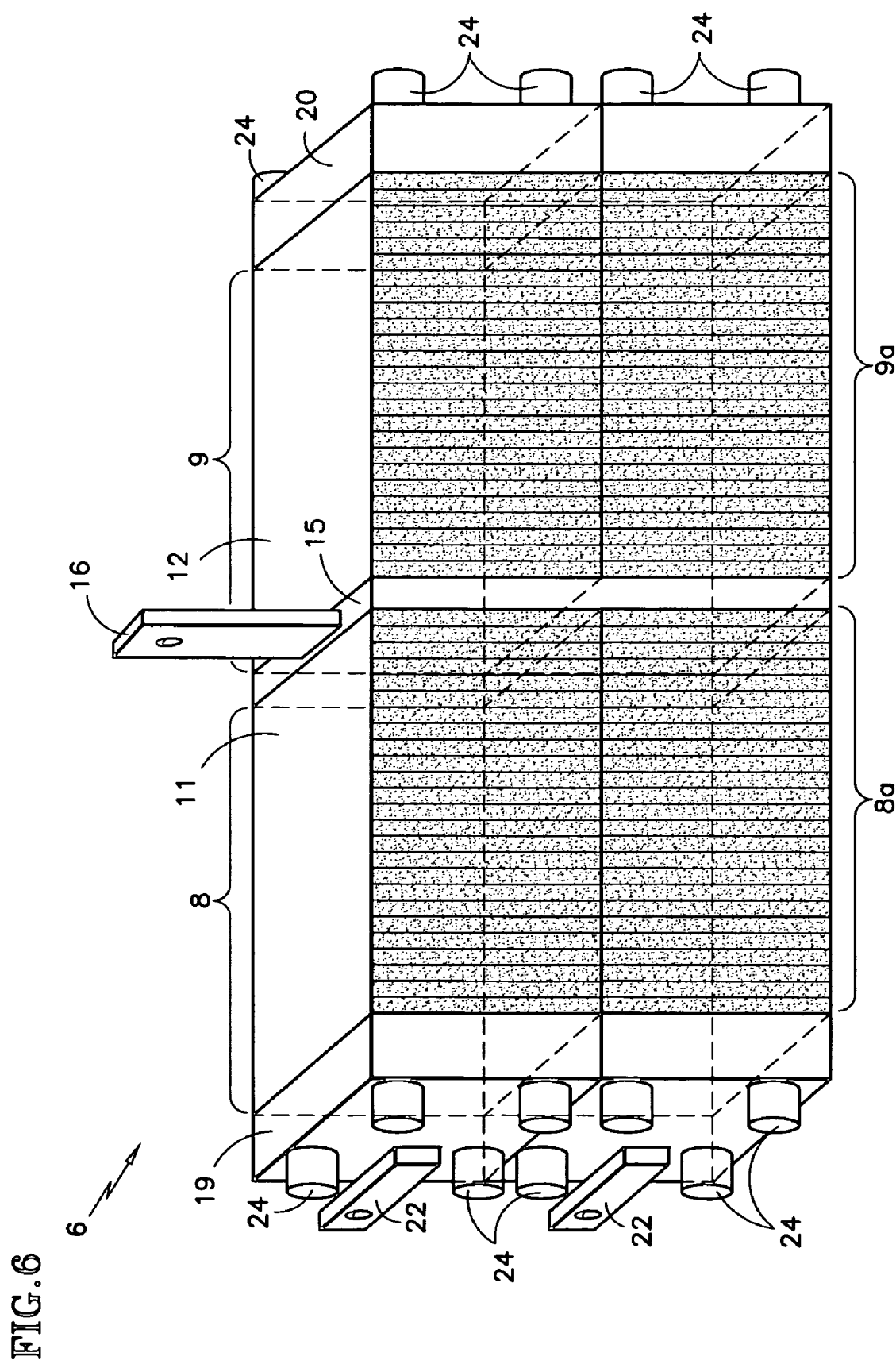
FIG. 6 is a simplified, stylized perspective view of four fuel cell stacks sharing a common current collector at the their cathode ends.

FIG. 6 illustrates four fuel cell stacks 8, 8a, 9, 9a disposed with their cathodes contiguous to a common current collector 15. In this arrangement, external manifolds may be used only on the top of the stacks 8, 9 and only on the bottom of the stacks 8a, 9a, for one of the reactant gases, the other reactant gas being provided through the internal manifolds 24.

Figure 7:
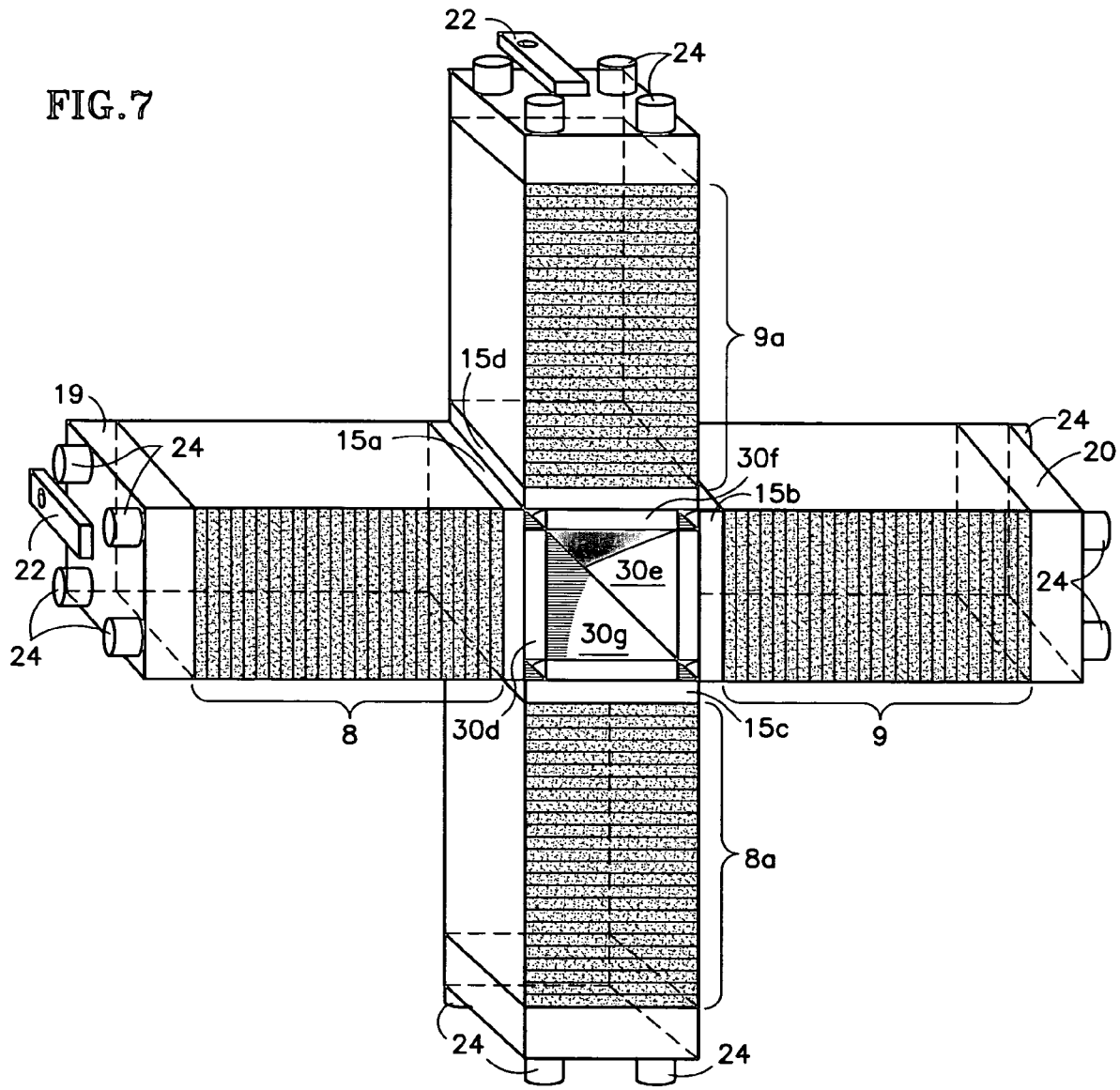
FIG. 7 is a simplified, stylized perspective view of a fuel cell power plant having four fuel cell stacks with their cathode ends together, each having a current collector and a heater.

In FIG. 7, four fuel cell stacks 8, 8a, 9, 9a, are disposed so that the cathode end of each stack is contiguous with an end of two adjacent stacks. In the embodiment of FIG. 7, each of the current collectors 15a–15d has a respective heater 30d–30g disposed adjacent thereto. This embodiment allows the use of external reactant gas manifolds on both sides of each stack.

The heater 30, 30a–30g may take any suitable form described in copending patent application Ser. No. 10/839,667, filed May 5, 2004.

The aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell power plant comprising:

a pair of fuel cell stacks each having a cathode end;

each of said stacks having a corresponding current collector disposed between the cathode ends of said pair of stacks;

each of said cathode ends disposed toward the other of said cathode ends, separated by an electrical isolator disposed between and contiguous with said current collectors; and a heater disposed within said electrical isolator.

* * * * *